United States Patent [19]

Appel et al.

[11] Patent Number: 5,628,095
[45] Date of Patent: May 13, 1997

[54] CLASP FOR JEWELRY

[75] Inventors: Richard Appel; Eginhard Wichelhaus, both of Kempten, Germany

[73] Assignee: Galileo Vision AG, Herzogenbuchsee, Switzerland

[21] Appl. No.: 411,524

[22] Filed: Mar. 28, 1995

[30] Foreign Application Priority Data

Mar. 29, 1994 [DE] Germany .......................... 44 10 891.5

[51] Int. Cl.[6] ........................... A44B 11/25; A44C 13/00
[52] U.S. Cl. ...................... 24/575; 403/315; 63/3.1; 24/265 EC; 24/265 R
[58] Field of Search .............. 24/265 WS, 265 EC, 24/575, 576, 578, 580, 706.2, 530, 531, 542, 573.2, 584, 628, 453, 299, 316, 323, 324, 326, 194; 403/315; 63/1.1, 2

[56] References Cited

U.S. PATENT DOCUMENTS

| 364,312 | 6/1887 | Sipe | 24/575 X |
|---|---|---|---|
| 1,024,566 | 4/1912 | Gifford | 24/575 |
| 1,600,916 | 9/1926 | Webber | 24/584 X |
| 1,759,550 | 5/1930 | Friedlander | 24/575 |
| 2,105,333 | 1/1938 | Roseman | 24/575 X |
| 2,503,570 | 4/1950 | Vogel . | |
| 3,412,576 | 11/1968 | Hodge | 24/299 X |
| 4,008,513 | 2/1977 | Griffiths | 24/589 |
| 4,562,704 | 1/1986 | Benedek et al. | 63/2 |
| 5,138,855 | 8/1992 | Faris | 63/1.1 X |
| 5,224,247 | 7/1993 | Collier | 24/575 X |

FOREIGN PATENT DOCUMENTS

| 26631 | 5/1898 | Bulgaria | 24/575 |
|---|---|---|---|
| 5855 | 12/1979 | European Pat. Off. | 24/575 |
| 2093131 | 1/1972 | France . | |
| 1869586 | 12/1962 | Germany . | |
| 3300846 | 5/1984 | Germany . | |
| 9101153 | 6/1991 | Germany . | |
| 9306363 | 9/1993 | Germany . | |
| 2165299 | 4/1986 | United Kingdom | 24/575 |

*Primary Examiner*—Peter M. Cuomo
*Assistant Examiner*—Robert J. Sandy
*Attorney, Agent, or Firm*—Robert W. Becker & Associates

[57] ABSTRACT

A jewelry clasp has a first and a second clasp member connected to one another for closing the clasp. At least the first clasp member has a spring-weighed element for achieving a fixation of a closed position of the clasp. The first clasp member has a first end portion with a first end face and further has a first receiving opening extending transverse to the longitudinal extension of the first clasp member. The second clasp member has a second end portion with a second end face and further has a second receiving opening extending transverse to a longitudinal extension of the second clasp member. The first receiving opening is oriented oppositely to the second receiving opening. The first and the second end portions are insertable into one another such that in a closed position of the clasp the spring-weighed element is forced against the second end face of the second clasp member.

8 Claims, 2 Drawing Sheets

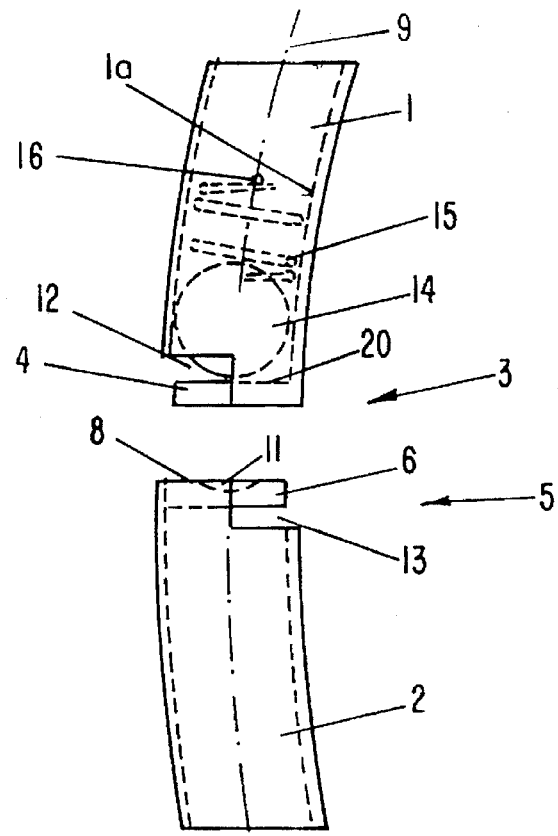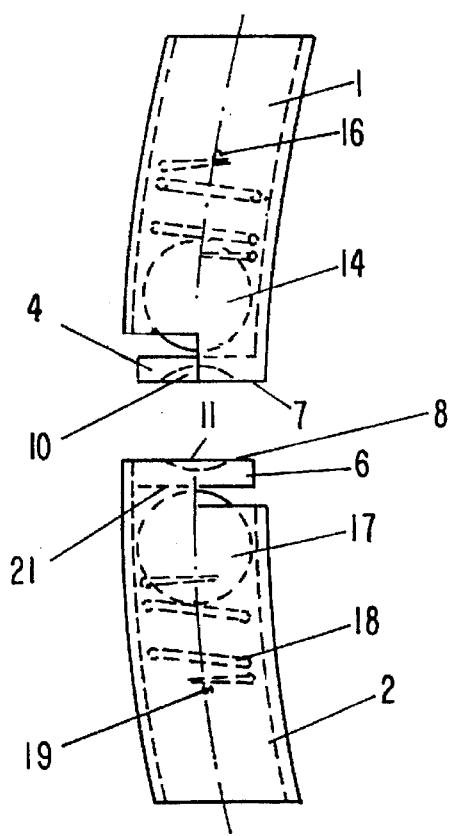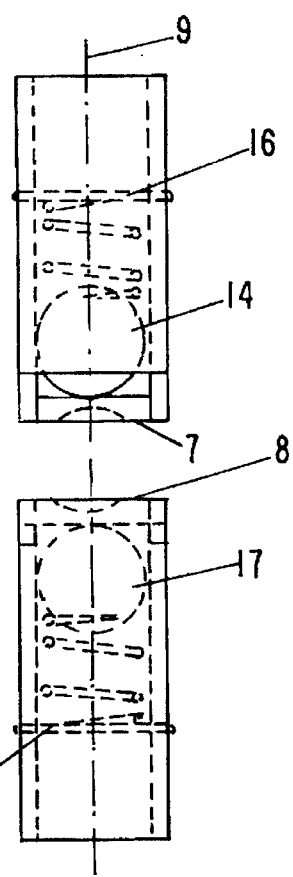

CLASP FOR JEWELRY

BACKGROUND OF THE INVENTION

The present invention relates to a clasp for pieces of jewelry, bracelets in particular, provided with two clasp members which can be connected to each other; the first clasp member is provided with a spring-weighed element in order to achieve a fixation of the closed position of the clasp.

A clasp of this kind is known from German Gebrauchsmuster No. 91 01 153. For closing this known clasp, the spring-weighed element is first inserted into the second clasp member, and, subsequently, the first clasp member is rotated by 90°, against the spring resistance, in order to aligh the second clasp member axially to the first clasp member in the closed position. This clasp has the disadvantage that both clasp members have to be held in one hand, respectively, for rotating the first clasp member relative to the second clasp member, so that a handling of this clasp with only one hand is not possible.

It is therefore an object of the present invention to improve the aforementioned clasp such that an easy handling, especially with only one hand, is possible, that the clasp can be manufactured easily, and that a secure fixation of the two clasp members in the closed position is guaranteed.

SUMMARY OF THE INVENTION

A jewelry clasp according to the present invention is primarily characterized by:

a first and a second clasp member connected to one another for closing the clasp;

at least the first clasp member comprising a spring-weighed element for achieving a fixation of a closed position of the clasp;

the first clasp member having a first end portion with a first end face and further having a first receiving opening extending transverse to a longitudinal extension of the first clasp member;

the second clasp member having a second end portion with a second end face and further having a second receiving opening extending transverse to a longitudinal extension of the second clasp member;

the first receiving opening oriented oppositely to the second receiving opening;

the first and the second end portions insertable into one another, wherein in a closed position of the clasp the spring-weighed element is forced against the second end face of the second clasp member.

Preferably, the first receiving opening extends transverse to a center axis of the first clasp member and is in the form of a first blind slot, and the second receiving opening extends transverse to a center axis of the second clasp member and is in the form of a second blind slot.

The first blind slot ends substantially at the center axis of the first clasp member, and the second blind slot ends substantially at the center axis of the second clasp member.

The spring-weighed element is a ball positioned in the first clasp member.

The second end face has a depression for receiving the spring-weighed element.

The second end portion has a second end plate comprising the second end face. The first receiving opening and the second end plate have the same width.

In a preferred embodiment of the present invention, the second end portion has a second end plate comprising the second end face and the first end portion has a first end plate comprising the first end face. The first and the second receiving openings and the first and the second end plates all have the same width.

The clasp preferably comprises a second spring-weighed element provided at the second clasp member, wherein in the closed position of the clasp the second spring-weighed element is forced against the first end face of the first clasp member. The first end face advantageously has a depression for receiving the spring-weighed element.

According to the present invention, the two clasp members are respectively provided at their end portions with transverse receiving opening extending in opposite directions such that the two clasp members can be inserted into each other at these end portions, and that the spring-weighed element within the first clasp member exerts pressure on the end face of the second clasp member. The inventive clasp is closed by a simple inserting movement: the end faces of the respective clasp members are inserted into the respective receiving openings, against the spring resistance of the spring-weighed element. In the closed position, the spring-weighed element then exerts pressure on the end face of the second clasp member such that the clasp is secured against opening. Since only a simple inserting movement, and no rotating of the clasp members relative to each other, is required, it is possible to handle the clasp with only one hand.

In order to manufacture the receiving openings as simply as possible, a further embodiment of the invention provides a design of the receiving openings such that they extend transversely as blind slots to the center axis of the first clasp member, respectively, the second clasp member. The blind slot can be manufactured by sawing into the end portion of a clasp member. In order to prevent break points within the clasps, the blind slots expediently reach approximately to the center axis of the first, respectively, the second clasp member. The remaining thickness of the clasp member material is sufficient for providing stability.

A further embodiment of the invention provides the spring-weighed elements to be designed as balls which are located within the first clasp member. On inserting the end face of the second clasp member into the first clasp member, the ball, due to its shape, is pushed back against the spring resistance and opens the receiving opening.

A particularly preferred embodiment of the invention provides a depression in the end face of the second clasp member for receiving the spring-weighed element. The clasp is locked by cooperation of the depression and the spring-weighed element.

In order to design the clasp form-fittingly (i.e., so as to have matching shapes) such that no clearance exists between the clasp members in the closed position, a further embodiment of the invention provides the same width for the receiving opening of the first clasp member and the end plate of the second clasp member. Expediently, both receiving openings and both end plates are provided with the same width.

A further, particularly preferred embodiment of the invention provides a spring-weighed element within the second clasp member; the spring-weighed element exerts pressure on the end face of the first clasp member in the closed position. Thereby an additional arresting action of the two clasp members is created. In order to create an arresting action also for the second clasp member, a further development of the invention provides a depression within the end face of the first clasp member for receiving the spring-weighed element of the second clasp member.

BRIEF DESCRIPTION OF THE DRAWINGS

The object and advantages of the present invention will appear more clearly from the following specification in conjunction with the accompanying drawings, in which:

FIG. 1 illustrates a side view of the inventive clasp according to a first embodiment;

FIG. 2 illustrates a side view of the clasp according to a second embodiment;

FIG. 3 illustrates a plan view according to FIG. 2; and

DESCRIPTION OF PREFERRED EMBODIMENTS

Figure 4:
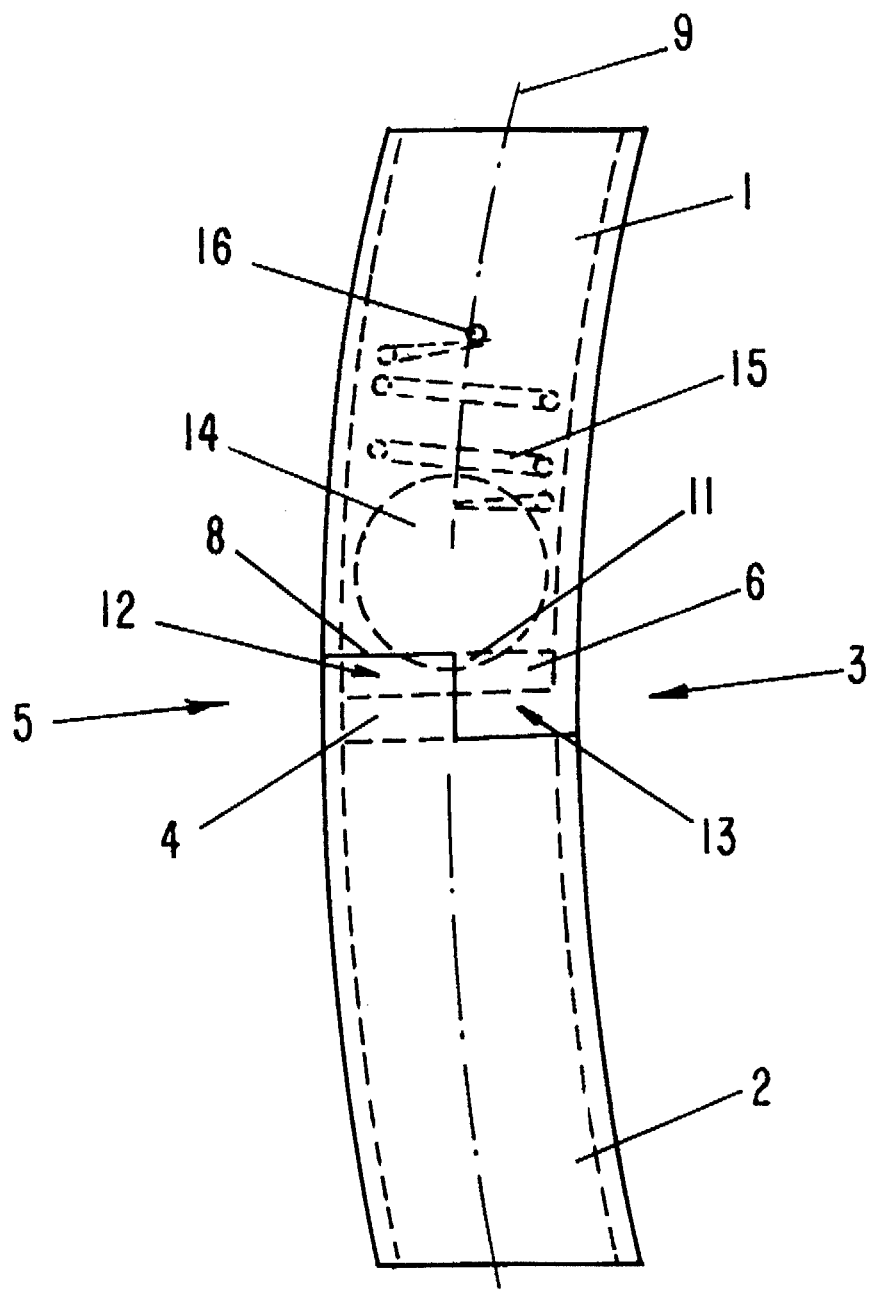
FIG. 4 shows the inventive clasp of the embodiment of FIG. 1 in the closed position.

The clasp comprises a first clasp member 1 and a second clasp member 2 which are linked to parts of a necklace or a bracelet (not illustrated). The clasp member 1 consists of a tube that is closed off by an end plate 4 provided at its end portion 3. The clasp member 2 also consists of a tube that is closed off by an end plate 6 provided at its end portion 5. The end plates 3, 4 have depressions 10, 11 at their end faces 7, 8 which are axially symmetrically arranged to the center axis 9 of the clasp member 1, respectively, the clasp member 2. At the clasp member 1, a receiving opening in the form of a transverse slot 12 extends to the center line 9. A receiving opening (transverse slot 13) is also provided at the clasp 2 and extends to the center axis 9. The open ends of the slots 12 and 13 point into opposite directions. The slots 12, 13 and the end plates 4, 6 are designed to have the same widths. Within the tube-shaped clasp member 1, a spring-weighed element 14 or an equivalently acting element, for example, a rubber element, is provided, which is designed as a ball and is loaded by a spring 15. One end of the spring 15 is supported by a pin 16 that extends transversely within the clasp member 1. A ball 17, loaded by a spring 18, is provided within the clasp member 2. At one end, the spring 18 is supported by a pin 19 that extends transversely within the clasp member 2. When the clasp is open, the two spring-weighed balls 14, 17 exert pressure on the interior wall 20 of the end plate 4, respectively, on the interior wall 21 of the end plate 6.

On closing the clasp, the end plate 6 is inserted into the transverse slot 12 and the end plate 4 is inserted into the transverse slot 13 by moving the end plates 4, 6 transversely relative to the center axis 9. In the embodiment according to FIG. 1, in which only one clasp member is provided with a spring-weighed element, the ball 14 is displaced upon insertion of the end plate 6 in the axial direction against the resistance of spring 15 until the end plate 6 abuts the inner wall 1a of the clasp member 2. In this closed position, the spring-weighed element 14 exerts pressure on the end face 8 of the end plate 6 of the second clasp member 2. The clasp is thus securely locked.

In the embodiment according to FIG. 2, the additional spring-weighed element 17 provided within the clasp member 2 is displaced, on inserting the end plate 4, against the spring resistance of the spring 18, such that, in the closed position, the element 17 exerts pressure on the end face 7 of the end plate 4 of the clasp member 1. By providing the second clasp member 2 with the spring-weighed element 17, an additional arresting action of the clasp in the closed position is achieved. For unlocking the clasp, the two clasp members 1, 2 are moved apart, transversely to the center axis 9. Since the opening and the closing movements of the clasp can be carried out by a simple inserting movement, the clasp can be handled easily, particularly with only one hand.

An additional fixation is achieved by providing the depression 11 in the first embodiment, respectively, the depressions 10, 11 in the second embodiment. In the closed position, the spring-weighed element 14 engages the depression 11, respectively, the spring-weighed element 17 engages the depression 10. An unintentional opening of the clasp is thus prevented.

The present invention is, of course, in no way restricted to the specific disclosure of the specification, examples, and drawings, but also encompasses any modifications within the scope of the appended claims.

What we claim is:

1. A jewelry clasp comprising:

a first and a second clasp member connected to one another for closing said clasp;

at least said first clasp member comprising a spring-weighed element for achieving a fixation of a closed position of said clasp;

said first clasp member having a center axis and a first end portion with a first end face and further having a first receiving opening extending transverse to a longitudinal extension of said first clasp member and extending to the center axis;

said second clasp member having a center axis and a second end portion with a second end face and further having a second receiving opening extending transverse to a longitudinal extension of said second clasp member and extending to the center axis;

said first receiving opening oriented oppositely to said second receiving opening;

said first and said second end portions insertable into one another, wherein in a closed position of said clasp said spring-weighed element is forced in an axial direction of said jewelry clasp against said second end face of said second clasp member; and wherein said second end face has a depression for receiving said spring-weighed element.

2. A clasp according to claim 1, wherein said first receiving opening extends transverse to said center axis of said first clasp member and is in the form of a first blind slot and wherein said second receiving opening extends transverse to said center axis of said second clasp member and is in the form of a second blind slot.

3. A clasp according to claim 2, wherein said first blind slot ends at the center axis of said first clasp member and wherein said second blind slot ends at the center axis of said second clasp member.

4. A clasp according to claim 1, wherein said spring-weighed element is a ball positioned in said first clasp member.

5. A clasp according to claim 1, wherein said second end portion has a second end plate comprising said second end face and wherein said first receiving opening and said second end plate have the same width.

6. A clasp according to claim 1, wherein said second end portion has a second end plate comprising said second end face and wherein said first end portion has a first end plate comprising said first end face and wherein said first and said second receiving openings and said first and said second end plates all have the same width.

7. A clasp according to claim 1, comprising a second spring-weighed element provided at said second clasp member, wherein in said closed position of said clasp said second spring-weighed element is forced against said first end face of said first clasp member.

8. A clasp according to claim 7, wherein said first end face of said first clasp member has a depression for receiving said second spring-weighed element.

\* \* \* \* \*